Aug. 22, 1967     A. L. DE LISLE     3,337,453
MEANS AND METHOD FOR DEFLUORIDATION OF WATER
Filed July 1, 1964     2 Sheets-Sheet 1
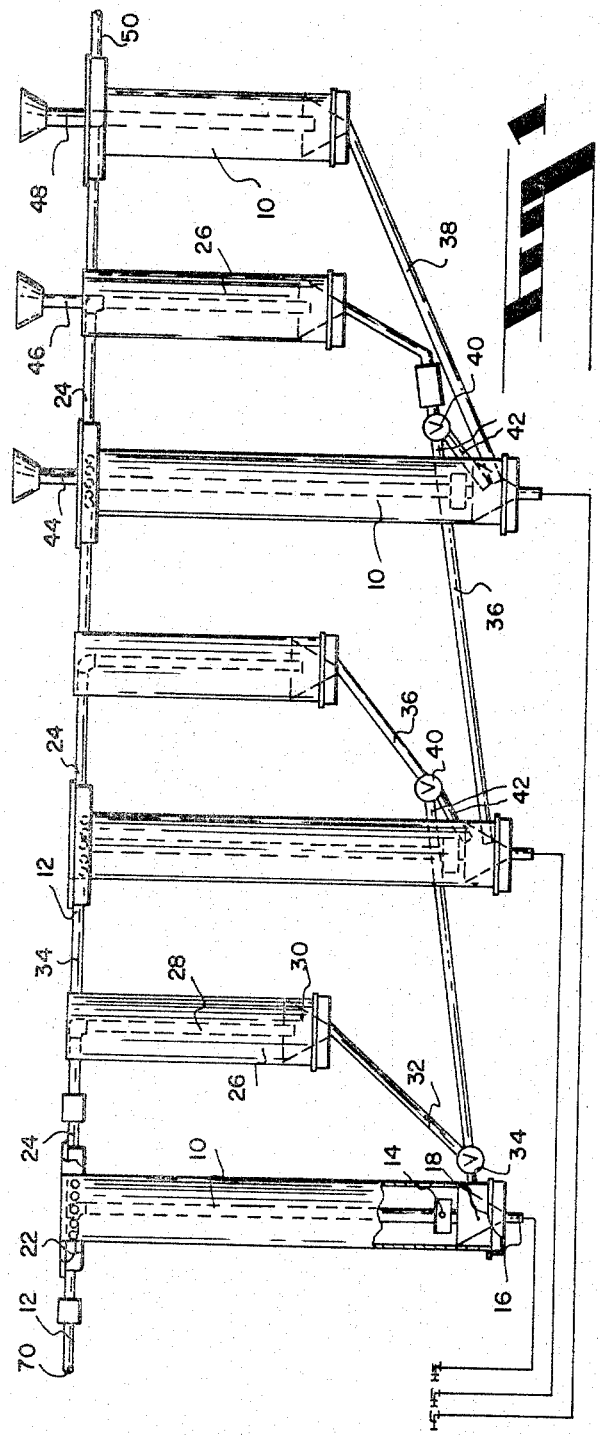
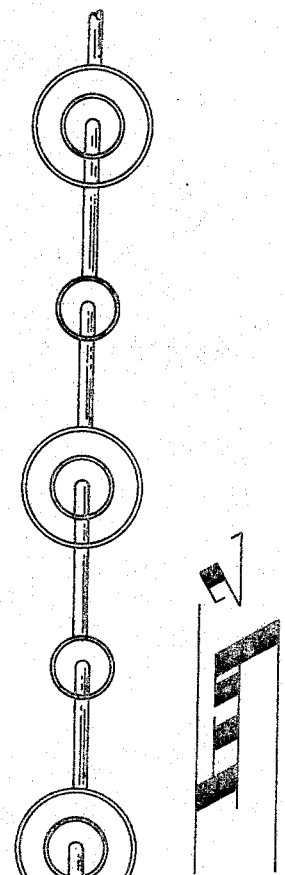
INVENTOR.
BY AUGUSTE LOUIS DE LISLE Aug. 22, 1967   A. L. DE LISLE   3,337,453
MEANS AND METHOD FOR DEFLUORIDATION OF WATER
Filed July 1, 1964   2 Sheets-Sheet 2
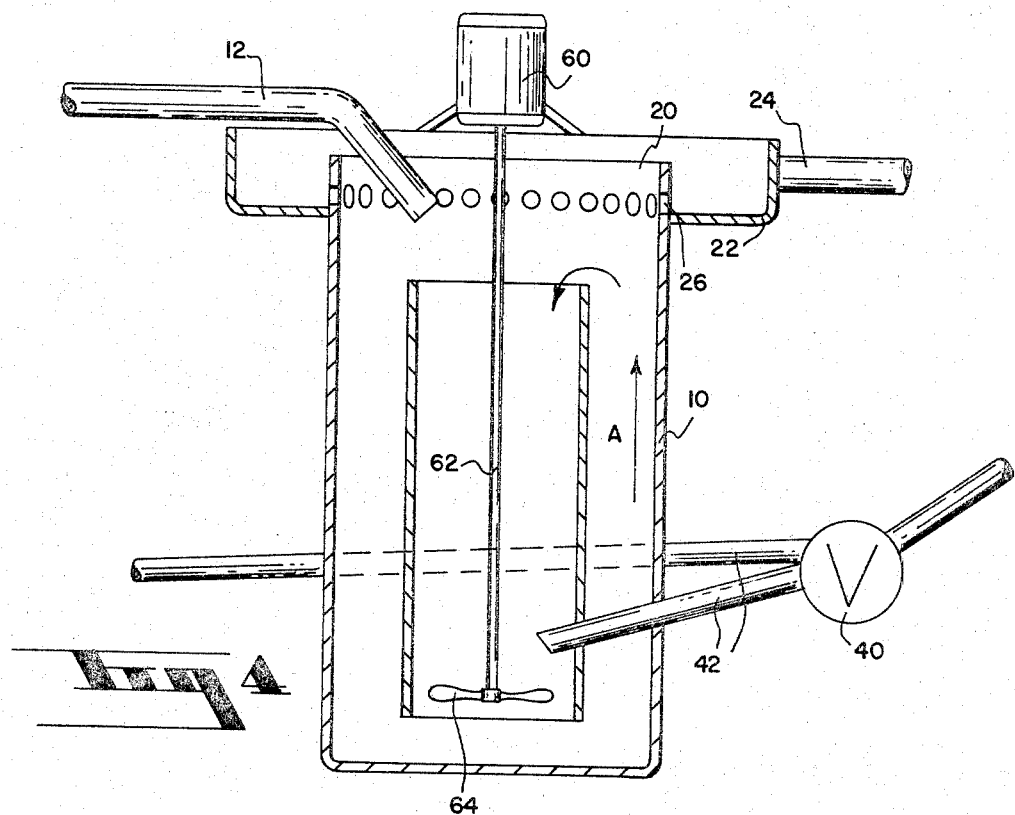
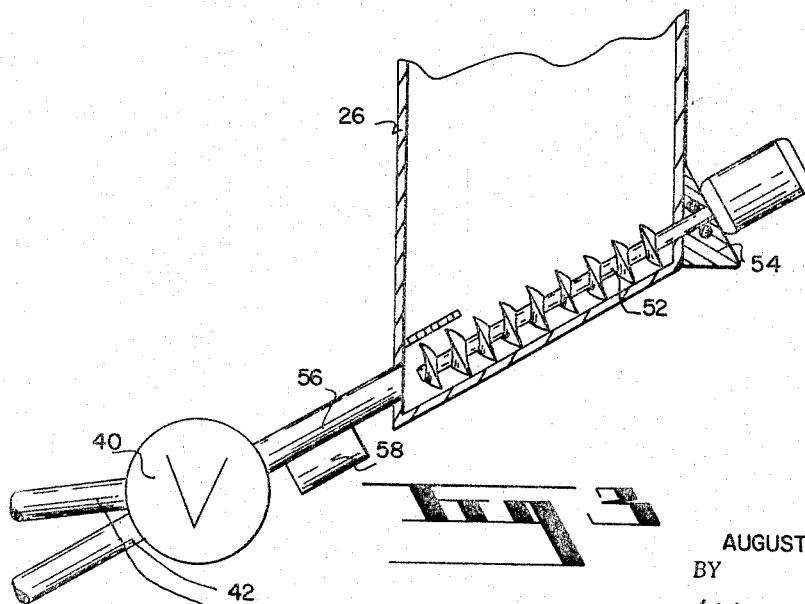
INVENTOR.
AUGUSTE LOUIS DE LISLE
BY
*Wm. H. Dean*

United States Patent Office 3,337,453
Patented Aug. 22, 1967

3,337,453
MEANS AND METHOD FOR DEFLUORIDATION OF WATER
Auguste Louis de Lisle, 6913 E. Cheery Lynn Road, Scottsdale, Ariz. 85251; Frances S. de Lisle, heir of said Auguste Louis de Lisle, deceased
Filed July 1, 1964, Ser. No. 379,536
18 Claims. (Cl. 210—46)

This invention relates to a means and method for defluoridation of water and more particularly to a means and method for use in removing fluorine from drinking water.

Excessive amounts of fluorine in drinking water cause serious damaging effects on human teeth and bone and possibly on other features of the human anatomy.

The distribution of fluorine in water supplies is not limited to any particular area, although the greatest concentration, both area wise and as to quantity of fluorine in water seems to be in the xerotic or more arid states. Obviously, the xerotic country may contain even more fluorine in the waters found there.

It is well known that there are four and one-half million people in the United States of America drinking excessive amounts of fluorine in their regular water supplies. Accordingly, the removal of substantial amounts of fluorine from drinking waters has become very critical.

Various prior art methods have been used for removing fluorine involving bone char, aluminum sulphate, sodium aluminate, zeolites, bauxites, silica gel, sodium silicate, calcium, phosphate, fluoride, limes and activated alumina.

In accordance with the prior art, waters have been treated with lime to remove fluorine, however, it has been found that removal of fluorine by lime treatment was due not to the lime, but to the precipitation of magnesium compounds in the water and such precipitation caused removal of fluorine by the magnesium due to reaction therewith.

It has been demonstrated that when magnesium hydroxide is precipitated in a solution, the metathesis between sodium fluoride present in the water and the magnesium hydroxide takes place so that magnesium hydroxide plus sodium fluoride in the water yields magnesium fluoride plus two sodium hydroxide which of course, in turn, reacts with any lime present to form calcium hydroxide and sodium carbonate. The magnesium so formed, then will eventually combine with three more molecules of magnesium oxide or hydroxide to form magnesium oxyfluoride which is practically insoluble though under certain conditions, such as highly buffered waters or highly alkaline waters, this magnesium oxyfluoride will have a solubility of approximately two or three parts per million. It may be that in many cases, no actual metathesis takes place, but rather a very complex sodium magnesium fluoride or sodium magnesium oxyfluoride is formed which is practically insoluble at certain pH values.

It will be readily apparent to those skilled in the art, that when very low amounts of materials, such as two or three or even ten or fifteen parts per million or milligrams per liter of one substance are present and when a substance is added whose solubility limit is twenty or thirty parts per million, then the probabilities of the contact between one molecule of the one substance with the necessary four molecules of another substance to produce an insoluble precipitant precipitated compound is of very low order. This is the reason that such a small amount of fluorine is removed by such a large quantity of magnesium because it is impossible to get a large quantity of magnesium other than the sulphate or some other soluble salt present in the water and then to precipitate it with lime which requires very large quantities to insure contact with every molecule of sodium fluoride in solution. The foregoing problem of frequencies posed what stands as an insuperable object to the prior art.

The prior art teachings also include the precipitation of gel particles of $Mg(OH)_2$ in water due to a reaction therein and that during the descent of such particles in the water that contact of such particles is made with fluorine containing water molecules. However, such contacts and resulting reactions of $Mg(OH)_2$ with fluorine in the water occurs at an extremely low rate or substantially ceases after such particles are completely precipitated.

Accordingly, it is an object of the present invention to provide a novel means and method for defluoridation of drinking water.

Another object of the invention is to provide a novel method for removing fluorine from water involving continued relative movement and impingement between fluorine in water and a particulate salt of magnesium having characteristically low solubility in water.

Another object of the invention is to provide a means and method for defluoridation of water comprising continuous relative movement of fluorine containing molecules of water relative to a large number of magnesium oxide sites whereby the fluorine in the water is presented to an infinite number of contact sites with which it may react to form an insoluble particulate material which may be settled out of the water into a sludge form.

Another object of the invention is to provide a very novel means for defluoridation of water comprising series groups of first and second containers wherein water is progressively moved in relation to a magnesium oxide salt of particulate form and successively settled and wherein the sludge from the settling containers is recirculated through the containers wherein relative movement takes place to thereby successively react fluorine from the water molecules with particulate magnesium oxide salts of a substantially insoluble character.

Another object of the invention is to provide a novel means for defluoridation of water wherein a plurality of successive reaction and settling containers are utilized in series and through which water is caused to flow with relation to particulate magnesium oxide salts and wherein makeup magnesium oxide salts are added to some of the successive reaction containers so that water containing the highest concentration of fluorine is initially presented to the particulate oxide salts having lowest concentration and wherein the water as it progresses through the successive containers contacts relatively higher concentrations of magnesium oxide particles until the fluorine content of the water has been reduced to a desired level.

Another object of the invention is to provide a means for defluoridation of water having novel sludge handling and recirculating and reacting means and novel means for making up reacted magnesium oxide salts and, further, novel means for settling sludge in series settling containers of the system of the invention.

Further objects and advantages of the invention may be apparent from the following specification, appended claims and accompanying drawings, in which:

FIG. 1 is a diagrammatic view of a means of the present invention used in connection with the method of the invention to remove fluorine from water;

FIG. 2 is another diagrammatic view showing the structure of FIG. 1 in plan and illustrating the containers of the system in more closely grouped relation;

FIG. 3 is a sectional view of a lower portion of one of the settling containers and illustrating a feed screw in the bottom thereof for forceably removing sludge therefrom; and FIG. 4 is a vertical sectional view of one of the reaction containers of the invention wherein water and particulate oxide salts of magnesium are moved relative to each other and reacted and illustrating means for causing relative movement of such materials in the container.

In accordance with the present invention, the relative movement of solids in a liquid may be presumed to follow the law of mass action in chemistry. The law of mass action in chemistry presupposes or states that solids have no value in calculating a reaction unless they are in solution. However, there are certain exceptions to this. The action, for example, for colloids and gels although there is assumed to be a transistional stage in actual solution which may possibly be true, but in the particular instance, the academic question of solubility is of no particular significance. According to the present invention, relative movement of fluorine containing molecules and particulate oxide salts of magnesium apparently is significant in that there is no particular affinity of the fluorine for the magnesium and that fluorine containing water molecules must actually impinge upon the magnesium oxide particle in order to initiate reaction of the fluorine with the magnesium and to capture the fluorine with relation to the particulate magnesium oxide salt so that the fluorine may be held and carried away with sludge and settled into the bottom of the container thereby permitting the water to be relieved of the fluorine and to be removed above the sludge.

It is well known that the production of magnesium hydroxide by chemical means causes it to be precipitated as a gel-gelatinous mass.

The particulate magnesium oxide salts in granular or finely divided state may be reacted with water to form a gel on the surface of each particle. Furthermore, during the calcination of magnesium carbonate to magnesium oxide, carbon dioxide is removed, leaving a quite porous structure; porous as in the sense of molecular dimensions. The interior of these pores of magnesium oxide, of course, becomes filled or coated with the magnesium hydroxide gel.

In accordance with the present invention, water, which is continuously moved in relation to these pores coated with magnesium hydroxide gel, causes the molecules bearing fluorine to contact this magnesium hydroxide gel and react.

Water passing these particles is presented with infinitely numerous hydroxyl sites. For example, at one part per million of sodium fluoride in a given water, the molecular relationship is one molecule of sodium fluoride to approximately three million molecules of water. Therefore, on the basis of total assurance of contact, at least three million molecules of magnesium hydroxide would have to be presented to a liter of water to insure that one molecule of sodium fluoride would be certain to contact the magnesium hydroxide site.

If the foregoing condition were all that was required, the problem would be relatively simple. But the composition of magnesium oxyfluoride, which we must assume to be the correct one in order to insure contact, is $MgF_2 3MgO 7H_2O$. Two molecules of sodium fluoride must first contact a molecule of magnesium oxide and metathesis takes place, presumably to form magnesium fluoride. Then three more molecules of magnesium hydroxide or oxide must combine with this to form the oxyfluoride.

It is a fair presumption based upon chemical thermodynamics that if these hydroxides were simultaneously presented during the reaction the reaction would proceed at a much more rapid rate than if they were presented in turn, in fact, it is very much to be doubted if the reaction could proceed stepwise, that is by the addition of molecule by molecule of magnesium oxide until eventually the oxyfluoride is formed. In order to provide an arrangement of conditions where assurance is had, that such contacts will be made simultaneously all the time during the passage of water in the process of the invention, it becomes necessary to provide a sufficient number of hydroxyl sites to insure the reaction with the water molecules containing fluorine. However, to proceed in an infinitely short time would require an infinitely great number of hydroxyl sites, which is impractical, so that some economic and arbitrary time must be selected for contact with the fluorine, which is to be removed, and this in turn determines the number of hydroxyl sites necessary to produce this effect. Accordingly, the invention comprises means for continuously moving water being treated relative to particulate oxide salts of magnesium and the continuous movement of these particles of the oxide salts of magnesium relative to fluorine containing molecules of water accomplishes the presentation of infinitely numerous hydroxyl sites upon which the fluorine containing molecules of water will impinge during the relative movement in the containers of the invention, as shown in FIGURE 1 of the drawings.

In accordance with the present invention, it is intended that the terms particulate oxide salt of magnesium may be construed to include $Mg(OH)_2$ basic magnesite, which is magnesium carbonate, also $Mg(OH)_2$ brucite, which is hydrated magnesium, also MgO magnesia or magnesium oxide, also $CaMg(OH)n$ calcined dolomite, which is calcium magnesium carbonate. These foregoing equivalents may be also termed mammalian non-toxic relatively insoluble (below 220 parts per million) oxygen containing binary, trinary, or quaternary salts of magnesium, all of these being in particulate form and capable of being suspended in or maintained in relative movement with water having fluorine containing molecules.

As shown in FIG. 1 of the drawings, a plurality of first containers 10 are reaction containers which contain particulate oxide salts of magnesium in suspension in water, and the water is added through an inlet 12 extending downwardly in the hollow container 10 to an outlet area 14, while air is introduced upwardly through a conduit 16 and funnel 18 to cause relative movement of the particulate oxide salt of magnesium and water in the container 10. The water added as it is agitated by the upward movement of air from the source 16 is moved continuously with respect to the particulate oxide salts of magnesium held in the container 10, and as shown in FIG. 4 of the drawings, the water, after it has been introduced through the conduit 12 and passed through the container 10, flows over an overflow edge 20 into an outflow container 22 having a water outlet 24 while a drainback opening 26, of which there are several, permits sludge to settle below the outlet 24. The outlet 24 of each container 10 passes into a second container 26, which is a settling chamber wherein conditions are relatively static, the water pasing downwardly through a tube 28 in the container 26 and the bottom of the container 26 is provided with a funnel portion 30 through which sludge gravitates into a conduit 32 down to a valve 34, which may be used as a drain valve, or may permit the sludge to pass into the cone 18 and to be recirculated and re-used in the initial container 10.

It will be seen that each of the second containers 26 is provided with an outlet 34 near its upper portion from which water passes after the sludge has settled in the container 26. This water then passes into a respective inlet 12 of the next container 10, which exhausts into another settling container 26. Accordingly, it will be seen that a series of first and second containers are reactive and settling containers, respectively, and that conduits 36 and 38 extend from the lower portions of the second containers backward to the respective upstream first containers 10. Diverting valves 40 are disposed in branch conduits 42 so that flow of sludge from the respective settling container 26 may be divided or diverted from flowing relative to the first containers 10. For example, the sludge from the settling containers 26 may flow through a valve 40 and be divided with respect to a pair of the first containers 10, or the sludge may be diverted by the valve 40 into either one of the containers, as desired.

A conduit means 44 is disposed to introduce particulate magnesium oxide salts into one of the containers 10 in order to make up for the magnesium oxide salts which have been reacted with fluorine. These salts, after being completely reacted, or partially so, may be drained from the valve 34 so that the means 44 may compensate for the mass of the sludge withdrawn and supply fresh, full strength magnesium oxide salts for reaction with the fluorine in the water.

A conduit 46 is disposed to introduce alum into one of the containers 26 and this is utilized as a settling agent in these containers and circulates through the series of containers so that settling of the sludge in the containers 26 is facilitated.

A conduit 48 is disposed to introduce lime into one of the containers 10 for the purpose of reacting or precipitating the excess magnesium in the solution to reduce alkalinity of the water and thereby render it potable in a pH range between 7.2 and 7.4 so that water passing from an outlet designated 50, which corresponds with one of the outlets 24, may be used to deliver potable water, as desired.

It will be understood that carbon dioxide may also be introduced into the conduit 48 in some instances, depending upon the buffered condition of the water being treated. Thus, $CO_2$, in some instances, may be adequate for reducing the magnesium content, consequently the alkalinity of the water, to render it potable.

As shown in FIG. 3 of the drawings, a screw conveyor 52 powered by a motor 54 is operated in a lower end of one of the settling containers 26, and this screw 52 forces sludge downwardly through a conduit 56 and through one of the valves 40, hereinbefore described. In addition, a vibrator 58 may be used in connection with the conduit 56 and/or the lower end of the container 26 to force the sludge to travel downwardly in the conduit 56 and from one of the second or settling containers 26 backwardly into one or more of the reacting containers 10.

As shown in FIG. 4 of the drawings, a modification of the means for creating relative movement between the water and the particulate oxide salt of magnesium is disclosed. This means includes a motor 60 having a shaft 62 extending downwardly into one of the containers 10 and having an impeller 64 secured to the lower end thereof. This impeller causes a circulation of water and particulate material in accordance with arrows A in FIG. 4. Thus, the water moves up and down in the container relative to and with the particulate salts of magnesium oxide, thereby creating innumerable opportunities for impingement of the fluorine containing molecules with hydroxyl sites to initiate the chemical reaction between the fluorine and the magnesium in order to render the fluorine captive in the insoluble materials which may be settled out of the water in a sludge form, as hereinbefore described.

It will be appreciated by those skilled in the art that the foregoing method and apparatus completely distinguishes from a prior art arrangement wherein a descending snowstorm of precipitated gel particles of $Mg(OH)_2$ as saturation and precipitation takes place, and the reaction being possible only during the precipitation and thereafter the hydroxyl sites being static. Inasmuch as it has been found that impingement of the fluorine containing molecule of water must be attained relative to the magnesium oxide salt particles the teaching of the invention comprises a great forward step in the art, since it teaches continuous movement of the particulate material and water relative to each other to insure a great number of hydroxyl sites upon which the fluorine containing water molecules may impinge.

As an example of the relative magnitude of probability, the following is representative.

At one part per million fluorine there are 956,844+ molecules of water to one molecule of sodium fluoride, and if this water were saturated as a solution with MgO at normal temperatures, there would be 57,333 molecules of water to each molecule of magnesium oxide (hydroxide) and in the case of a ten parts per million fluorine water, 95.684 molecules of water to each molecule of fluorine. Now all forty are required to react with the ten. What are the probabilities of such reaction? Since we cannot even solve the three body problem this is a hopeless approach, and it can only be stated that the probabilities of such a completion of reaction are infinitely small.

From the foregoing it is clear that the method and the apparatus of the invention clearly provides an effective means for economically removing fluorine from drinking water. With reference to the apparatus, shown in FIG. 1 of the drawings, it will be seen that the raw water inlet designated 70 in FIG. 1 of the drawings introduces water into the first container 10 at which sludge from the other containers 26 has been introduced so that the water containing the highest concentration of fluorine is reacted with particulate oxide salts of magnesium of the lowest concentration in the overall series of containers, shown in FIG. 1, and that the addition of the particulate magnesium oxide salts by means of the conduit 44 causes this highly concentrated material, which has not been reacted, to be introduced in the container 10, which is several containers downstream from the initial water admission, whereby the water, by the time it reaches the container 10 in which the conduit 44 introduces new magnesium oxide material, the fluorine content of the water is substantially reduced and it is then subjected to the highest concentration of reactive magnesium oxide salts, thereby providing a counter flow method which is very effective in substantially and readily reducing the fluorine content of the water with a minimum number of reaction and sludge settling containers in series, all as shown in FIG. 1 of the drawings.

In accordance with a modification of the invention, a bed of particulate oxide salts of magnesium may be prepared and water may be caused to flow through the bed to provide relative movement of the fluorine containing water molecules and the particulate oxide salts of magnesium. Such an adaptation of the invention, employing a bed, may be in the form of a replaceable tank containing particulate oxide salts of magnesium, or a plurality of tanks in series, whereby water which is caused to flow through such tanks is relieved of fluorine in accordance with the present invention. Thus, the term, bed, as used herein may be construed to define particulate oxide salts of magnesium which are contained in a manner to permit the flow of water through and between the magnesium oxide particles.

It will be obvious to those skilled in the art that various modifications of the present invention may be resorted to in a manner limited only by a just interpretation of the following claims.

I claim:
1. A method for removing fluorine and other materials from water consisting in introducing fluorine bearing water into a first container and causing relative movement and impingement between fluorine in said water in said first container and a particulate oxide salt of magnesium therein having characteristically low solubility in water, whereby impingement of fluorine containing molecules with said particulate oxide salt of magnesium initiates a reaction to produce an insoluble particulate compound of magnesium and fluorine; then directing said water and partially reacted particulate sludge of said oxide salt of magnesium into a second container separate from and independent of said first container so as to be unaffected by the relative movement and impingement between fluorine in the water and particulate salt of magnesium in said first container and permitting said sludge to be in relatively static condition and to settle in lower portions of said second container while removing water from an upper portion of said second container.

2. The method of claim 1 further comprising the steps of progressively directing said water through a plurality of said first and second containers in series and continuing said relative movement of said particulate oxide salts of magnesium and said fluorine in said water within said first containers and moving the sludge from said second containers and into said first containers until the fluorine content of the water has been reduced to a desirable extent.

3. A method for removing fluorine and other materials from water consisting in introducing fluorine bearing water into a first container and causing relative movement and impingement between fluorine in said water in said first container and a particulate oxide salt of magnesium therein having characteristically low solubility in water, whereby impingement of fluorine containing molecules with said particulate oxide salt of magnesium initiates a reaction to produce an insoluble particulate compound of magnesium and fluorine; then directing said water and partially reacted particulate sludge of said oxide salt of magnesium into a second container and permitting said sludge to be in relatively static condition and to settle in lower portions of said second container while removing water from an upper portion of said second container and progressively directing said water through a plurality of said first and second containers in series and continuing said relative movement of said particulate oxide salts of magnesium and said fluorine in said water within said first containers and removing the sludge from the lower portions of said second containers and conducting said sludge into said first containers for further movement and reaction relative to the water and its fluorine content in said first containers, and adding particulate oxide salts of magnesium to a succeeding one of said first containers through which the water progresses, whereby water having relatively low fluorine content reaching said succeeding one of said first containers is subject to contact with a relatively great concentration of available particulate oxide salts of magnesium.

4. A method for removing fluorine and other materials from water consisting in introducing fluorine bearing water into a first container and causing relative movement and impingement between fluorine in said water in said first container and a particulate oxide salt of magnesium therein having characteristically low solubility in water, whereby impingement of fluorine containing molecules with said particulate oxide salt of magnesium initiates a reaction to produce an insoluble particulate compound of magnesium and fluorine; then directing said water and partially reacted particulate sludge of said oxide salt of magnesium into a second container and permitting said sludge to be in relatively static condition and to settle in lower portions of said second container while removing water from an upper portion of said second container and progressively directing said water through a plurality of said first and second containers in series and continuing said relative movement of said particulate oxide salts of magnesium and said fluorine in said water within said first containers and moving the sludge from said second containers and into said first containers until the fluorine content of the water has been reduced to a desirable extent and adding particulate oxide salts of magnesium to said containers to replace that reacted with said fluorine and draining a portion of said sludge from said containers to substantially balance the bulk of the added particulate oxide salt of magnesium and adding a precipitating agent to a last one of said containers in said series to precipitate excess magnesium in said water in order to attain a potable pH condition of the water; and withdrawing the water from said last one of said containers.

5. A method for removing fluorine and other materials from water consisting in introducing fluorine bearing water into a first container and causing relative movement and impingement between fluorine in said water in said first container and a particulate oxide salt of magnesium therein having characteristically low solubility in water, whereby impingement of fluorine containing molecules with said particulate oxide salt of magnesium initiates a reaction to produce an insoluble particulate compound of magnesium and fluorine; then directing said water and partially reacted particulate sludge of said oxide salt of magnesium into a second container and permitting said sludge to be in relatively static condition and to settle in lower portions of said second containers while removing water from an upper portion of said second container and progressively directing said water through a plurality of said first and second containers in series and continuing said relative movement of said particulate oxide salts of magnesium and said fluorine in said water within said first containers and moving the sludge from said second containers and into said first containers until the fluorine content of the water has been reduced to a desirable extent; and removing said sludge from the lower portion of said second containers and conducting said sludge into said first containers for further movement and reaction relative to said water and its fluorine containing molecules in said first containers and adding particulate oxide salts of magnesium to a last one of said first containers through which said water progresses whereby water having a relatively low fluorine content and reaching said last one of said first containers is subject to contact with the greatest concentration of available particulate oxide salts of magnesium.

6. The method of claim 5, further consisting of draining a portion of the sludge from said containers to substantially balance the bulk of the added particulate oxide salts of magnesium.

7. A method for removing fluorine and other materials from water consisting in introducing fluorine bearing water into a first container and causing relative movement and impingement between fluorine in said water in said first container and a particulate oxide salt of magnesium therein having characteristically low solubility in water, whereby impingement of fluorine containing molecules with said particulate oxide salt of magnesium initiates a reaction to produce an insoluble particulate compound of magnesium and fluorine; then directing said water and partially reacted particulate sludge of said oxide salt of magnesium into a second container and permitting said sludge to be in relatively static condition and to settle in lower portions of said second containers while removing water from an upper portion of said second container and progressively directing said water through a plurality of said first and second containers in series and continuing said relative movement of said particulate oxide salts of magnesium and said fluorine in said water within said first containers and moving the sludge from said second containers and into said first containers until the fluorine content of the water has been reduced to a desirable extent; and removing said sludge from the lower portion of said second containers and conducting said sludge into said first containers for further movement and reaction relative to said water and its fluorine containing molecules in said first containers and adding a particulate oxide salt of magnesium to a succeeding one of said first containers through which said water progresses whereby water having a relatively low fluorine content and reaching said succeeding one of said first containers is subject to contact with a relatively great concentration of available particulate oxide salts of magnesium.

8. In a means for removing fluorine and other materials from water the combination of: a first container; a water inlet therefor; a water outlet for said first container, said first container adapted to hold fluorine bearing water and a particulate salt of magnesium therein; first means disposed to cause continuous relative movement of said water and said particulate salt of magnesium in said first container; a second container; second means disposed to conduct water from the outlet of said first container to said second container, said second container and its contents adapted to be maintained in a relatively static condition to allow sludge to settle therein; and third means disposed to move and conduct said sludge from a lower interior portion of said second container into said first container and into an area therein within influence of said first means to thereby recirculate partially reacted particulate salts of magnesium through said first container; a water outlet in the upper portion of said second container; a plurality of said first and second containers in series with each other; certain of said water outlets of said second containers being disposed to deliver water to the inlets of some of said first containers; and means for adding particulate salts of magnesium to a succeeding one of said first containers through which the water progresses, whereby water having a relatively low fluorine content reaching said succeeding one of said first containers is subject to contact with a relatively great concentration of available particulate oxide salts of magnesium.

9. In a means for removing fluorine and other materials from water the combination of: a first container; a water inlet therefor; a water outlet for said first container, said first container adapted to hold fluorine bearing water and a particulate salt of magnesium therein; first means disposed to cause continuous relative movement of said water and said particulate salt of magnesium in said first container; a second container; second means disposed to conduct water from the outlet of said first container to said second container, said second container and its contents adapted to be maintained in a relatively static condition to allow sludge to settle therein; and third means disposed to move and conduct said sludge from a lower interior portion of said second container into said first container and into an area therein within influence of said first means to thereby recirculate partially reacted particulate salts of magnesium through said first container; said third means having a motor operated feed screw communicating with the lower interior of said second container and operable to force sludge therefrom and into said first container.

10. In a means for removing fluorine and other materials from water the combination of: a first container; a water inlet therefor; a water outlet for said first container, said first container adapted to hold fluorine bearing water and a particulate salt of magnesium therein; first means disposed to cause continuous relative movement of said water and said particulate salt of magnesium in said first container; a second container; second means disposed to conduct water from the outlet of said first container to said second container, said second container and its contents adapted to be maintained in a relatively static condition to allow sludge to settle therein; and third means disposed to move and conduct said sludge from a lower interior portion of said second container into said first container and into an area therein within influence of said first means to thereby recirculate partially reacted particulate salts of magnesium through said first container; said third means having a conduit extending downwardly from said second container to said first container and a vibrator disposed to vibrate said sludge through said conduit of said third means for moving sludge from a lower interior of said second container and into said first container.

11. In a means for removing fluorine and other materials from water the combination of: a first container; a water inlet therefor; a water outlet for said first container, said first container adapted to hold fluorine bearing water and a particulate salt of magnesium therein; first means disposed to cause continuous relative movement of said water and said particulate salt of magnesium in said first container; a second container; second means disposed to conduct water from the outlet of said first container to said second container, said second container and its contents adapted to be maintained in a relatively static condition to allow sludge to settle therein; and third means disposed to move and conduct said sludge from a lower interior portion of said second container into said first container and into an area therein within influence of said first means to thereby recirculate partially reacted particulate salts of magnesium through said first container; a water outlet in said second container; a plurality of said first and second containers in series with each other; water outlets at upper portions of said second containers disposed to deliver water to said inlets of some of said first containers; said third means having branch conduit means interconnecting a lower portion of one of said second containers with lower portions of a plurality of said first containers, and valve means disposed to divide the flow of sludge through said branch conduit means whereby the sludge from a lower portion of a second container may be divided and delivered to said plurality of said first containers.

12. In a means for removing fluorine and other materials from water the combination of: a first container; a water inlet therefor; a water outlet for said first container, said first container adapted to hold fluorine bearing water and a particulate salt of magnesium therein; first means disposed to cause continuous relative movement of said water and said particulate salt of magnesium in said first container; a second container; second means disposed to conduct water from the outlet of said first container to said second container, said second container and its contents adapted to be maintained in a relatively static condition to allow sludge to settle therein; and third means disposed to move and conduct said sludge from a lower interior portion of said second container into said first container and into an area therein within influence of said first means to thereby recirculate partially reacted particulate salts of magnesium through said first container; a water outlet in said second container; a plurality of said first and second containers in series with each other; water outlets at upper portions of said second containers disposed to deliver water to said inlets of some of said first containers; said third means having branch conduit means interconnecting a lower portion of one of said second containers with lower portions of a plurality of said first containers, and valve means adapted and disposed optionally to conduct flow of sludge from said one of said second containers through said branch conduit means and into any one of said plurality of first containers.

13. In a means for removing fluorine and other materials from water the combination of: a first container; a water inlet therefor; a water outlet for said first container, said first container adapted to hold fluorine bearing water and a particulate salt of magnesium therein; first means disposed to cause continuous relative movement of said water and said particulate salt of magnesium in said first container; a second container; second means disposed to conduct water from the outlet of said first container to said second container, said second container and its contents adapted to be maintained in a relatively static condition to allow sludge to settle therein; and third means disposed to move and conduct said sludge from a lower interior portion of said second container into said first container and into an area therein within influence of said first means to thereby recirculate partially reacted particulate salts of magnesium through said first container; a motor driven impeller disposed in said first container in position to cause relative movement of said water from said inlet upwardly through said particulate oxide salt of magnesium in said first container; said first container having an upper open end having an overflow edge; an enlarged outflow container portion of said first container adapted to receive flow passing over said edge, said outlet of said first container disposed to drain water from said outflow container portion; and means disposed to drain sludge from a lower portion of said outflow container back into said first container.

14. In a means for removing fluorine and other materials from water the combination of: a first container; a water inlet therefor; a water outlet for said first container, said first container adapted to hold fluorine bearing water and a particulate salt of magnesium therein; first means disposed to cause continuous relative movement of said water and said particulate salt of magnesium in said first container; a second container; second means disposed to conduct water from the outlet of said first container to said second container, said second container and its contents adapted to be maintained in a relatively static condition to allow sludge to settle therein; and third means disposed to move and conduct said sludge from a lower interior portion of said second container into said first container and into an area therein within influence of said first means to thereby recirculate partially reacted particulate salts of magnesium through said first container; said first container having an upper open end provided with an overflow edge; an outflow container disposed to receive water flowing over said edge, said outlet of said first container disposed to drain water from said outflow container portion; and means disposed to drain sludge from a lower portion of said outflow container back into said first container.

15. In a means for removing fluorine and other materials from water the combination of: a first container; a water inlet therefor; a water outlet for said first container, said first container adapted to hold fluorine bearing water and a particulate salt of magnesium therein; first means disposed to cause continuous relative movement of said water and said particulate salt of magnesium in said first container; a second container; a second means disposed to conduct water from the outlet of said first container to said second container, said second container and its contents adapted to be maintained in a relatively static condition to allow sludge to settle therein; and third means disposed to move and conduct said sludge from a lower interior portion of said second container into said first container and into an area therein within influence of said first means to thereby recirculate partially reacted particulate salts of magnesium through said first container; said first container having a hollow body and a substantially vertical tube therein and disposed to receive water from said inlet; said tube having a lower open end spaced from the bottom of said body; an impeller disposed to force water downwardly in said tube and upwardly therearound and through said particulate oxide salts of magnesium in said first container; said first container having an upper portion provided with an overflow means; said container having an enlarged outflow container portion disposed to receive water flowing from said overflow means, said outlet of said first container disposed to drain water from said outflow container portion; and means disposed to drain sludge from a lower portion of said outflow container back into said first container.

16. In an apparatus for removing fluorine from water the combination of: a first container having a water inlet and a water outlet, said first container adapted to hold fluorine bearing water and a particulate salt of magnesium therein; first means disposed to cause continuous relative movement of said water and said particulate salt of magnesium in said first container; a second container separate from and independent of said first container, whereby the contents of said second container are undisturbed by said first means; second means disposed to conduct water from the outlet of said first container to said second container, said second container and its contents adapted to be maintained in a relatively static condition to allow sludge to settle therein; third means disposed to move and conduct said sludge from a lower interior portion of said second container into said first container and into an area therein within influence of said first means to thereby recirculate partially reacted particulate salts of magnesium through said first container; a plurality of said first and second containers connected in series with each other; and fourth means disposed to conduct water from selected ones of said second containers to said first containers.

17. The apparatus of claim 16 wherein said selected ones of said second containers have a water outlet connected to the water inlet of the next succeeding first containers.

18. The apparatus of claim 16 wherein the outlet for said first container is located adjacent the upper edge thereof, and the inlet for said second container to which said first container outlet is connected is lower than the upper edge of said first container, whereby the overflow from said first container is fed by gravity to said second container; and the lower interior portion of said second container from which sludge is conducted is higher than the area of said first container which receives such sludge to permit gravity feed of such sludge from said second container to said first container as aforesaid.

References Cited
UNITED STATES PATENTS

| | | | |
|---|---|---|---|
| 1,053,171 | 2/1913 | Hendryx | 210—523 |
| 2,128,569 | 8/1939 | Velz | 210—46 |
| 2,401,924 | 6/1946 | Goetz | 210—46 |
| 2,428,418 | 10/1947 | Goetz et al. | 210—46 |
| 2,447,511 | 8/1948 | Leaf | 210—59 X |

FOREIGN PATENTS 905,793  4/1945  France.

OTHER REFERENCES

Adsorption of Fluoride From Aqueous Solution, J. Am. Chem. Soc., vol. 69, 1947, pp. 1312–1315.

Zettlemoyer, A.C. et al.: Active Magnesia II.

MORRIS O. WOLK, *Primary Examiner.*

MICHAEL E. ROGERS, *Examiner.*